(12) United States Patent
Lo

(10) Patent No.: US 6,973,206 B2
(45) Date of Patent: Dec. 6, 2005

(54) METHOD AND SYSTEM FOR QUALITY BASED FINGERPRINT MATCHING

(75) Inventor: Peter Lo, Lake Forest, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/834,618

(22) Filed: Apr. 29, 2004

(65) Prior Publication Data

US 2005/0141754 A1 Jun. 30, 2005

Related U.S. Application Data

(60) Provisional application No. 60/533,031, filed on Dec. 29, 2003.

(51) Int. Cl.[7] .............................................. G06K 9/00
(52) U.S. Cl. ..................... 382/124; 382/115; 382/116; 382/125; 382/225; 340/5.53; 340/5.83; 356/71; 707/7
(58) Field of Search ......................... 382/124, 125, 382/115, 116, 225; 340/5.53, 5.83; 356/71; 902/3; 713/186; 707/1, 3, 6, 7

(56) References Cited

U.S. PATENT DOCUMENTS

| | | | |
|---|---|---|---|
| 5,465,303 A * | 11/1995 | Levison et al. | 382/124 |
| 5,796,857 A * | 8/1998 | Hara | 382/124 |
| 5,815,252 A * | 9/1998 | Price-Francis | 356/71 |
| 5,960,101 A | 9/1999 | Lo et al. | |
| 6,072,891 A * | 6/2000 | Hamid et al. | 382/116 |
| 6,181,807 B1 * | 1/2001 | Setlak et al. | 382/124 |
| 6,633,882 B1 * | 10/2003 | Fayyad et al. | 707/101 |
| 2004/0062426 A1 | 4/2004 | Lo | |

OTHER PUBLICATIONS

U.S. Appl. No. 10/323,406, Lo.

\* cited by examiner

*Primary Examiner*—Bhavesh M. Mehta
*Assistant Examiner*—John Strege
(74) *Attorney, Agent, or Firm*—Valerie M. Davis

(57) ABSTRACT

A method including the steps of:) receiving (202) a search record; generating (206) at least one hierarchical cluster, each having a different minimum quality level; for each cluster, generating (210) at least one corresponding search package having a first set of search prints; selecting the highest quality cluster (218), a search package (222) and corresponding file records for performing a search (226); determining (230) whether a hit was found between any file print in the corresponding file records and any search print in the selected search package; and proceeding with the search process through the remaining quality clusters in an order based on decreasing quality until a match is found or until there are no remaining file records against which to compare a search package.

24 Claims, 2 Drawing Sheets

METHOD AND SYSTEM FOR QUALITY BASED FINGERPRINT MATCHING

This application claims benefit of 60/533,031 filed on Dec. 29, 2003.

FIELD OF THE INVENTION

The present invention relates generally to automatic fingerprint identification systems, and more specifically to a system and method for matching a search record against file records in a database based on the quality of the prints in the search record and in the database.

BACKGROUND OF THE INVENTION

Identification pattern systems, such as ten print or fingerprint identification systems, have played a critical role in modern society in both criminal and civil applications. For example, criminal identification in public safety sectors is an integral part of any present day investigation. Similarly in civil applications such as credit card or personal identity fraud, print identification has become an essential part of the security process.

An automatic fingerprint identification operation normally consists of two stages. The first is the registration or enrollment stage and the second is the identification, authentication or verification stage. In the enrollment stage, an enrollee's prints and personal information are enrolled and matching features of the enrolled prints, such as minutiae, are extracted. The personal information and the extracted features, and perhaps the images, are then typically used to form a file record that is saved into a file database for subsequent identification of the enrollee. Present day automatic fingerprint identification systems may contain several hundred thousand to several million of such file records.

In the identification stage, one or more prints from an individual or a latent print may be obtained. Matching features are generally extracted from each print and, along with personal information, are formed into what is typically referred to as a search record. The search record is then compared with the enrolled file records in the database of the fingerprint matching system. In a typical search scenario, a search record may be compared against millions of file records that are stored in the database and a list of matched scores is typically generated as a result of this matching process. Candidate records are sorted according to matched scores. A matched score (also referred to herein as a similarity score) is a measurement of the similarity of the print features of the identified search and file records. Typically, the higher the score, the more similar the file and search records are determined to be. Thus, a top candidate is the one that has the closest match.

However it is well known from verification tests that the top candidate may not always be the correctly matched record because the obtained prints may vary widely in quality. Smudges, individual differences in technique of the personnel who obtain the prints, equipment quality, and environmental factors may all affect print quality. To ensure accuracy in determining the correctly matched candidate, the search record and the top n file records from the sorted list are typically provided to an examiner for manual review and inspection. Once a true match is found, the identification information is provided to a user and the search print may be discarded from the identification system or added to the file database depending on system requirements. If a true match is not found, a new file record is typically created, from the personal information and print features of the search record, and added to the file database.

A number of solutions have been developed to improve the accuracy of matched scores and to reduce the workload of manual examiners. Most of these solutions have focused on designing improved fingerprint scanners to obtain better quality print records and designing a better fingerprint enhancement process and feature extraction algorithm to obtain better matching features. Some solutions have also focused on designing a better matching algorithm to better distinguish a matching print from a non-matching print. Better decision logic systems have also been developed to reduce the number of candidates that a fingerprint examiner would subsequently review.

One of the more recently developed solutions includes a process for building an integrated and robust database for use during the identification stage. This solution is based on the generation and use of active search records and active file records, i.e. included in a filtered database, during a matching process. Accordingly, a set of search prints having the highest quality of all of the search prints that were enrolled for an enrollee are formed into an active search record. This active search record is matched against an active file database, which likewise includes prints of a quality above a given threshold and is thereby typically smaller than the file database of a traditional automatic fingerprint identification system (AFIS). Moreover, any duplicate file records, for instance, in the file database are saved into passive file records in a passive database that is linked to the active file database but that is not used in the actual fingerprint matching process.

Another more recent solution includes a progressive fingerprint matching system. Traditionally, a pre-determined number of fingers was used for every search, and a match (i.e., hit) or no match (i.e. no hit) decision was made after all of the fingers in the corresponding search record had been searched against the entire database and averaged matched scores determined based upon the combined matched scores from all of the fingers searched. Lower accuracy typically resulted from the use of averaged scores. By contrast, this more recent solution includes a method to search a filtered file database using one finger at a time, wherein a match or no match decision can be made at each searched finger level instead of considering the match reports of all the fingers.

This method is faster than the traditional fixed finger search method in two ways. First, the database used is in accordance with the solution described above, which is smaller than the traditional AFIS file database, wherein only the active file database is used in the matching process. Second, the hit or no hit decision is made at the finger level instead of the case level, so the search can in some instances be stopped earlier in time. Nonetheless, additional search efficiency and accuracy can be realized by leveraging, in the matching process, the retrieval of file records from a file database based on the quality of prints in the active search record.

Thus, there exists a need for an improved automatic fingerprint identification system and method that achieves substantially increased speed without sacrificing accuracy in the identification process, and that uses quality during the generation of search records and during the matching process and that further uses quality as a criteria for retrieving file records from a file database to enable this additional speed and accuracy.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
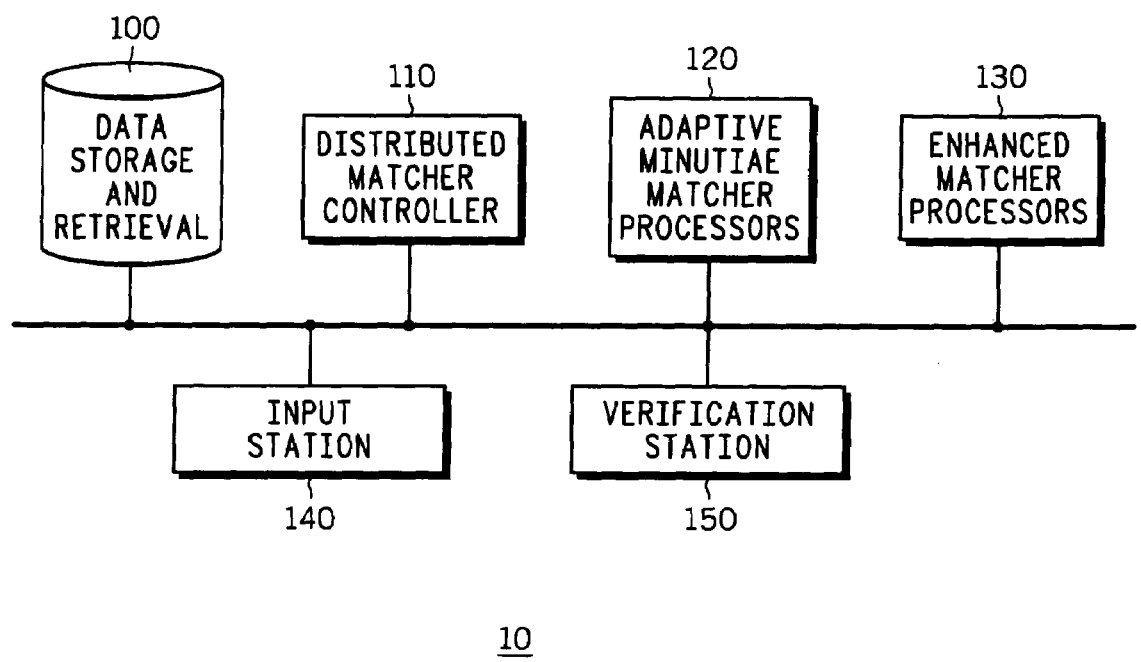
FIG. 1 illustrates a simple block diagram of an automatic fingerprint identification system in accordance with an embodiment of the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

FIG. 1 illustrates an automatic fingerprint identification system (AFIS) 10 that may be used to incorporate the inventive system and method described herein. System 10 ideally includes an input and enrollment station 140, a data storage and retrieval device 100, a distributed matcher controller 110, at least one conventional adaptive minutiae matcher processor 120 (also referred to herein as a coarse minutiae matcher processor), at least one conventional enhanced matcher processor 130 and a verification station 150.

Input and enrollment station 140 is used to capture a print and to optionally extract the relevant matching features of that print for later comparison. File records may also be generated in the input and enrollment station 140 from the captured prints and extracted features. In the input and enrollment station 140, the enrolled prints (also referred to herein as print images) are segmented and quality is assigned to each print to ensure that the print is of sufficient quality to be matched. The integrity of fingerprints may also be checked to ensure that each print image was captured in accordance with one or more capture guidelines. For instance, the integrity of fingerprints can be checked by a slap to roll comparison to determine whether each rolled print was correctly positioned, labeled and segmented. An active file record may be generated from prints having sufficient quality, as controlled by a pre-determined quality threshold, and passive file records may be generated from, for instance, prints whose quality are insufficient or from duplicate prints.

Input and enrollment station 140 may also be used to capture a fingerprint and to optionally extract the relevant matching features of that image for comparison with matching features in one or more file records. A search record may also be generated in the input and enrollment station 140 from the captured images and extracted features. In the input and enrollment station 140, the enrolled prints are segmented and quality is assigned to each print. The integrity of fingerprints is also checked. An active search record may be generated from prints having sufficient quality. Otherwise, the prints may be re-enrolled (i.e., one or more additional prints captured and their quality analyzed), and an active search record extracted from all of the enrolled prints. Thus, input and enrollment station 140 may be coupled to, for instance, flat bed scanners, a ten-print live scanner and a digital camera, which may be used to scan prints or capture latent prints that may be loaded into a processor device such as, for instance, a microprocessor that may be also be coupled to or incorporated within the enrollment station 140 for performing its remaining functions.

Data storage and retrieval unit 100 stores and retrieves the file records, including the matching features, and may also store and retrieve other data useful to carry out the present invention. Adaptive minutiae matcher processors 120 and enhanced matcher processors 130 typically use the extracted matching features of the prints to determine similarity or may be configured to make comparisons at the image level, and verification station 150 is used to verify matching results. Moreover, it is appreciated by those of ordinary skill in the art that although input and enrollment station 140 and verification station 150 are shown as separate boxes in system 10, these two stations may be combined into one station in an alternative embodiment.

In operation, the distributed matcher controller 110 receives the active search record from the input and enrollment station 140 and retrieves the active file records from the active file database stored in the data storage and retrieval unit 100. Controller 110 then distributes the active search and file records to the adaptive minutiae matcher processor for performing matching processing one finger at a time, wherein the controller 110 collects the match reports after each finger match is completed. The results of each finger match is evaluated by a decision logic to determine whether or not a hit is found, and if a strong hit, for instance, is found the search is completed.

Otherwise, a down-selection process in controller 110 may be performed, wherein an ordered or sorted list of possible sets of matching prints is generated for further detailed evaluation. In accordance with this down-selection process, a list of mated minutiae for each set of prints is produced and those prints having scores above a pre-defined level are sent to the secondary matchers block 130 for a more detailed matching process. The matched results are evaluated again by the decision logic in the controller 110, and if a hit is found, the search is completed. Otherwise, the next finger is selected as a search finger and the above-described matching process, that is performed in the controller 110 and the matcher processors 120 and 130, is repeated until a hit is found or the desired number fingers are searched, e.g., all the fingers from the active search record.

The search and file records may be processed, for instance, from unsolved latent prints, ten prints, a set of finger prints, slap prints, palm prints, etc. An unsolved latent print is typically defined as a finger or palm print lifted from a crime scene or unknown source whose owner is unknown. A ten print or set of fingerprints generally means a set of 10 or less fingerprints that may have been taken from a person by either the rolled or flat method of capturing the prints in a media. A slap print is the literal slapping of the user's inked hands onto a media or the literal slapping of the user's hands onto a fingerprint capture sensor. Typically, the prints are processed to produce an active search record against which filtered file records processed from a file database is compared. It is understood that ten prints may include toe or palm prints as well. Each print provides a record of data that may include, for instance, a classification of each print as one of four major print types (i.e., arch, left loop, right loop, and whorl) as well as minutiae which have respective X-Y coordinate positions and angles of orientation as is well known in the art.

Figure 2:
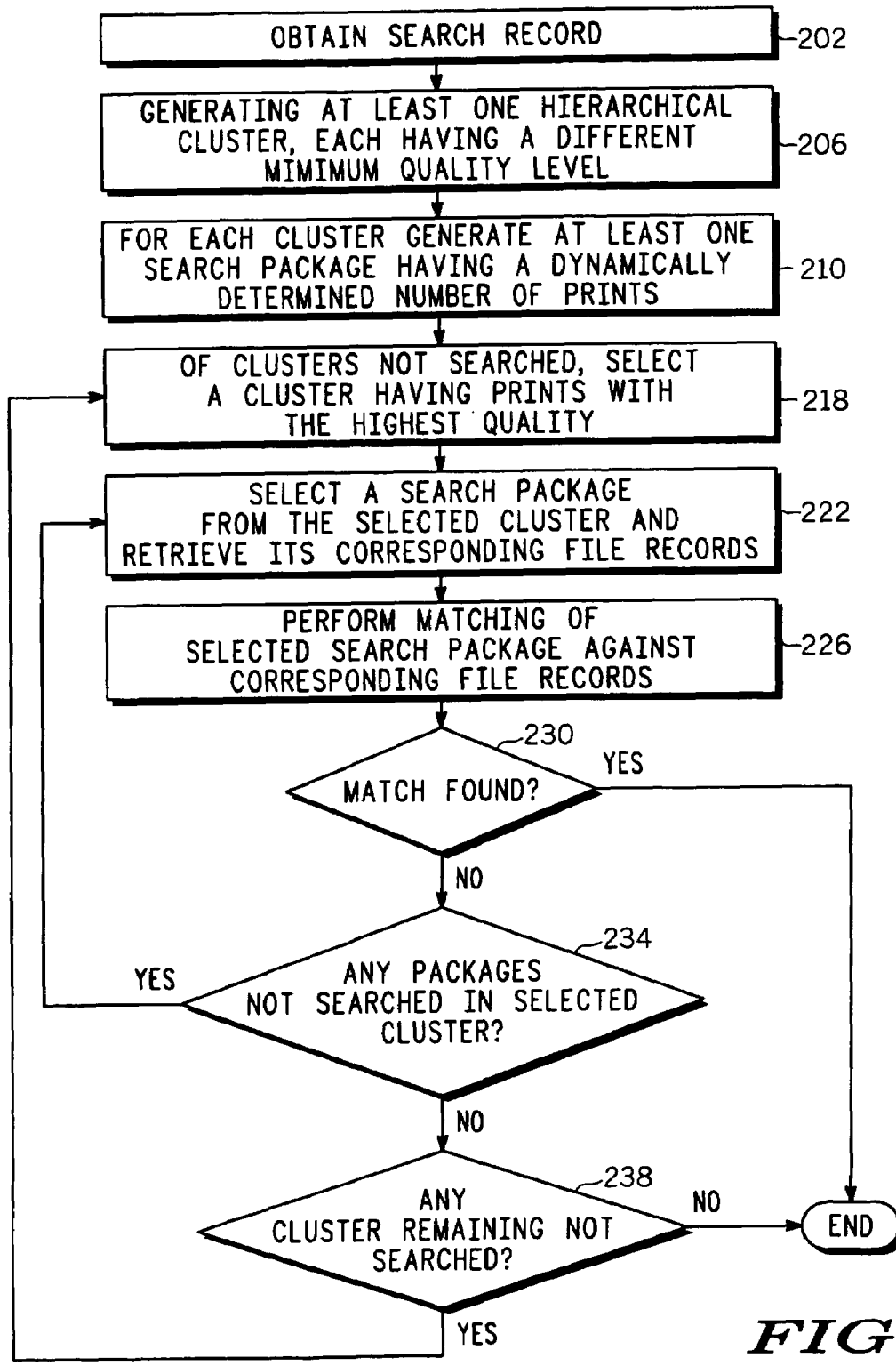
FIG. 2 illustrates a flow diagram of a method for fingerprint matching in accordance with an embodiment of the present invention.

FIG. 2 illustrates a flow diagram of a method for fingerprint matching in accordance with an embodiment of the present invention. The method of FIG. 2 may be stored as software in a suitable storage, e.g., memory, device and may be implemented, i.e., executed, in one or more processors or processing devices in system 10. Alternatively, the methods in accordance with the present invention may be implemented in a hardware device such as, for instance, an application specific integrated circuit. For example in one embodiment of the present invention, the method of FIG. 2 may be executed in a microprocessor of the distributed matcher controller 110.

In accordance with the method of FIG. 2, an active search record is first received (202) into the distributed matcher controller 110 from the input and enrollment station 140. To generate the active search record, a plurality of prints, e.g. fingerprints, may be enrolled, wherein the prints are captured, features are extracted, and the prints are checked for quality and integrity. The active search record is extracted if the prints are deemed of sufficient quality, i.e. at least equal to a predefined quality threshold. Otherwise, re-enrollment may occur, wherein additional prints are enrolled, and the active search record may then be extracted from all the enrolled prints. Ideally the active search record comprises ten prints, i.e., search prints, but may include fewer prints based on the enrollment circumstances.

Upon receipt of the active search record, the distributed matcher controller 110 obtains accuracy requirements for the search results and generates from the active search record at least one quality cluster (206) for a total of N number of different hierarchical quality clusters, wherein each quality cluster is defined based on a different desired minimum quality level, and prints associated with that cluster have a quality at least equal to the minimum quality of the corresponding cluster. Furthermore, to achieve, for instance a customer's, accuracy requirements a number of fingers are assigned to each quality cluster for the purpose of performing the matching process. Finger assignment guidelines are determined off-line as a function of the particular accuracy characteristics of the AFIS system being used to perform the matching process and may be stored, for instance, in an accuracy table in the data storage and retrieval device 100.

Images that fall within the range of quality for a given level are included in that cluster. Accordingly, quality levels are determined based on the premise that the matching accuracy is similar for the images having the same level of quality. For instance, let us assume the value of image quality is ranged from 0 to 100, wherein 0 means worst quality and 100 means best quality. The value range may then be further quantized into N levels according to the matching rate. Let's assume N is 4, wherein each quality level, is named "A", "B", "C" and "D" respectively. The range for each level may then be selected such that the matching accuracy is similar for that level. For instance, the range for levels A, B, C and D, respectively, may be selected as 80 to 100, 60 to 80, 40 to 60 and 0 to 40. Thus, all print images having at least a quality that falls within the range assigned to the A level are included in the A cluster, and all the print images having A level or B level are included in the B cluster and so on for C and D. The clusters are hierarchical in the sense that the cluster B includes the images in the cluster A, and the cluster C includes the images in the cluster B, which already includes the images in the cluster A, etc.

When all of the print images from the search record have been assigned to quality clusters, the images from the A quality cluster should have a higher accuracy rate than the B, C or D quality clusters. By the same token, the images from the B quality cluster should have a higher accuracy rate than the C or D quality clusters, and so on. In other words, the A quality cluster images will require fewer fingers for matching than the B, C or D quality clusters to achieve the same accuracy. Thus, by dividing each record into different quality cluster of images, a different number of fingers can be assigned to each cluster to achieve a desired balance between accuracy and speed.

Once the prints have been organized into the quality clusters (206), the distributed matcher controller 110 then generates at least one search packet (also referred to herein as a search package) within each quality cluster (210), each said search packet having a dynamically determined set of prints. The set includes the number of prints assigned to the corresponding quality cluster and includes only those fingers in the search record having at least the desired minimum quality. A total of M search packages may be generated across all of the N clusters, wherein all possible different finger number combinations for a given number of fingers associated with each quality cluster are formed as search packages.

Simply matching the search packages against the entire database will not achieve the desired accuracy requirements. Instead, to achieve the accuracy requirements, each search packet must be searched against file records having prints, i.e. file prints, which are of a quality at least equal to that of the prints in the search packet (i.e., at least equal to the minimum quality level of a corresponding quality cluster) and including at least the fingers included in the corresponding search record. Thus, the distributed matcher controller 110 dynamically retrieves the file records according to each search package. In this way, the file database is virtually divided into some virtual file bins corresponding to the number of search packages, wherein the prints in each search packet have a similar desired quality to the corresponding prints in its corresponding virtual file bin, and there are corresponding fingers between the two.

Ideally, the file database is a filtered file database such as, for instance, an active file database such as is described above. In addition, each file record ideally includes ten prints although a given file record may contain fewer prints. Moreover, to increase the speed of the matching process, ideally each virtual file bin contains file records that are exclusive of those file records contained in any of the other virtual file bins. In other words, once a no hit is found for a given file record, that file record is not matched against any other search package. This is possible because where a no hit is found for a given file record against a search package of a given quality, one can be correspondingly certain to a degree of accuracy required by the customer that the person associated with that file record is not the same person as the one associated with the search record. Thus, organizing the active search record in the manner described above, and performing the matching process of the search record against the active file database partitioned as described above enables the system and method of the present invention to achieve substantially greater accuracy and speed over what may be achieved in the prior art.

The following is a brief example of how an active search record may be organized into quality clusters and search packets and how the file records are retrieved according to each search packet in accordance with the present invention to achieve a desired accuracy requirement within a given AFIS system. Let us assume that: an active database has only A and B quality level fingerprints; the active search record contains three prints that are A quality and the rest of the prints are B quality; the customer wants to achieve an accuracy of a 99.8% hit rate; and the AFIS system has the following accuracy table for A quality search records matched against A quality file records and for at least B quality search records matched against at least B quality file records.

A quality database matched against all A quality search records

| No. Fingers | 1 | 2 | 3 | 4 | 5 | 6 |
|---|---|---|---|---|---|---|
| Hit Rate >= | 98.5% | 99.8% | 99.9% | 99.99% | ... | ... |

A or B quality database matched against all A or B quality search records

| | No. | | | | | |
|---|---|---|---|---|---|---|
| Fingers | 1 | 2 | 3 | 4 | 5 | 6 |
| Hit Rate >= | 92.5% | 98.8% | 99.5 | 99.8% | ... | ... |

Accordingly, the numbers of fingers assigned to each different quality cluster should yield a projected accuracy equal to or greater than the customer's accuracy requirement. Based on the above accuracy table, the AFIS system requires two A quality fingerprints to be assigned for a search against A quality file records in order to achieve the required 99.8% hit rate and four B or better quality fingerprints to be assigned for a search against B or better quality file records in order to achieve the requires 99.8% hit rate. As can be seen from the above table, to achieve a desired accuracy requirement, typically a smaller number of fingers may be assigned to clusters associated with a higher quality of prints.

If fingers 1, 5 and 6 are the three A quality finger prints in the search record, the corresponding search packets for the A quality cluster are determined based on these three fingers. Specifically, the prints in each search packet are based on all of the different two-finger combinations for fingers numbers 1, 5 and 6. Thus three search packets for the A quality cluster may be first generated, i.e., the finger numbers are 1 and 6 for a search package 1, 1 and 5 for a search package 2, and 5 and 6 for a search package 3. The corresponding file records for the search packages 1, 2 and 3 are retrieved according to their defined quality and the finger number respectively. In this way, the file database of A quality prints is, therefore, virtually divided into three corresponding file bins as follows: based on the finger numbers 1 and 6 of package 1, the file records having A quality fingerprints for both finger numbers 1 and 6 are formed as file bin 1; based on the finger numbers 1 and 5 of package 2, the file records (other than those in file bin 1) having A quality fingerprints for finger numbers 1 and 5 are formed as file bin 2, and based on the finger numbers 5 and 6 of package 3, the file records (other than those in file bins 1 and 2) having A quality fingerprints for both finger numbers 5 and 6 are formed as file bin 3. In the same manner, additional quality clusters, search packages and corresponding file records can be determined until all the file records are virtually divided.

Once the quality clusters, search packages, and the corresponding file records have been determined, the matching process may be commenced. The matching process begins by selecting the highest quality cluster (218), i.e., the cluster having the highest minimum quality level, and proceeds through the remaining quality clusters in an order based on decreasing quality until a match is found or until there are no remaining file records in the database or until there are no remaining search packets in the search record. Thus, once the highest quality cluster (of those not searched) has been selected (218), a search packet from the selected quality cluster is selected and corresponding file records retrieved (222). Ideally, the search packet is selected based upon some metric such as, for instance, finger index order, for enabling a more efficient search.

The selected search packed is then matched against its corresponding file records (226), ideally in accordance with a matching strategy that is based on the quality of the fingerprints in the search package. This may further increase the accuracy of the matching process. For instance, a less complicated search strategy (such as one based on a single level search using a single matcher processor, e.g., a minutiae matcher processor 120) may be used for searches between higher quality search packages and file records. Whereas, a more complicated search strategy (such as one based on a multi-level search using one or more matcher processors, wherein perhaps at least one matcher processor performs a more detailed processing, e.g., an enhanced matcher processor, than at least one other matcher processor, e.g., a coarse minutiae matcher processor) may be used for searches between lower quality search packages and file records.

The search between the selected search packet and its corresponding file records is ideally performed at the finger level such as described above and known in the art, such that the search will end if it is determined (230) that a match has been found between any finger in the selected search packet and a corresponding finger in any corresponding file record. When the process ends with a match, the likelihood that a true match was found is within the customer's accuracy requirements, thereby increasing the accuracy of the search over that which may be achieved in the prior art. If no match is found between the selected search packet and any corresponding file record, it is determined (234) whether all of the search packets for the selected quality cluster have been searched. If not, the next search packet and corresponding file records are selected (222), and the matching process is repeated. Otherwise, it is determined (238) whether all of the quality clusters have been searched. If not, the quality cluster having the highest quality of those not searched is selected (218), and the process continues. Otherwise, if all of the search packets in all of the quality clusters have been searched and no hit was found, the process ends, wherein the likelihood that the person associated with the search record has no matching file record in the file database is within the customer's accuracy requirements.

In the above manner, a match may be determined at both the virtual bin level and the finger level without being required to search through the entire database for any one search. This greatly increases the speed of the search over that which may be achieved in the prior art.

Following is an example of how the method for fingerprint matching in accordance with an embodiment of the present invention and illustrated in the flow diagram of FIG. 2 may be performed. This example is based on the above example, wherein three search packets 1, 2 and 3 were generated including finger numbers 1 and 5, 1 and 6, and 5 and 6, respectively. Let's assume search packet 1 and its corresponding file records are selected to initiate the matching process. Since this is a search packet having the highest quality, the matching process may be performed based on a single-level matching strategy such as, for instance, by minutiae matcher processors 120. The search is performed one finger at a time beginning, for instance, with finger number 1, wherein finger number 1 of package 1 is searched against finger number 1 of the corresponding file records. The matched results are evaluated by a decision logic such as, for instance, an intelligent decision logic (IDL), e.g. IDL-1 logic.

The intelligent decision algorithms utilize the foregoing features. First, IDL may determine the number of potential hits for each selected finger and then makes a record level decision based on individual finger hits status with record level features. The record level decision provides the number of identified match "hits" found for the search and the strength of each hit. Based on the strength of the hit, a more detailed match may be used to search these records again. If a strong hit is found, the search is complete. After the detailed match, the results are re-evaluated by IDL again. In this way, the number of candidates for visual verification is reduced and it also improves the search response time. Since the decision is made in multi-level stages and more orthogonal features are used, the identification accuracy is also improved. The decision system may be configured to include two or more modules. For instance, the minutiae matcher results evaluation logic may be identified as IDL-1, and the secondary, or enhanced, matcher evaluation results may be identified as IDL-2. It should be understood by those of ordinary skill in the art that the matching strategy for a given quality cluster may also have more than two levels as a function of quality. There may for instance be an IDL-3 logic, etc.

Returning to the matching process, if a match is not found for finger number 1, the second finger in that package is matched against the corresponding A quality fingerprints in the corresponding file records. The current matched results and previous matched results are evaluated by a decision logic such as IDL-1 logic. If a match is found, the fingerprint search is complete. If a match is not found, the next search packet 2 and its corresponding file records may be selected and the matching process repeated. The matching process continues until all the fingers in all of the search packets 1, 2 and 3 of the A quality cluster or all of the records of the file database are searched or a match is found, whichever comes first.

If there were additional quality clusters such as, for instance, clusters B, C and D, each having a lower quality, respectively, and there was no match found in the A quality cluster and some file records still remain that have not been searched, the search would proceed with the cluster having the next highest minimum quality level, i.e., the B quality cluster. One or more of these lower quality clusters may be searched using a multi-level matching process, ideally a two-stage matching process. In this case, let's assume the C and D quality clusters are searched in this multi-level manner. Thus, each package of the B quality cluster is searched finger by finger against the corresponding file records until a match is found, in accordance with the single-level matching strategy. Otherwise the search proceeds through the C and D quality clusters, ideally using a two-stage matching process, until a match is found.

In the two stage matching process, the search is first carried out by a minutiae matcher for each finger. After a search is completed for that finger, the results are evaluated by IDL-1 logic. If no match is found, instead of searching the next finger the top N candidate of that finger are sent to enhanced matcher processors 130 for performing a more detailed matching, and the results are evaluated by a decision logic such as IDL-2 logic. If no match is found, the search then continues to the next finger and next package and the corresponding file records until a match is found or until all of the search packets have been matched.

In summary, the database is retrieved and matched based on the search packages, and the number of the search packages is determined based on the accuracy of the system for different quality databases. Since the database is virtually divided into smaller bins, and previously searched file records are not used in any subsequent search of the same search record, the database is divided and conquered. The matching process proceeds from the highest quality to the lowest quality cluster, from finger to finger, and package to package to that of the corresponding records. Different match strategies may also be assigned to different quality clusters. Moreover, smaller numbers of fingers are assigned to the higher quality search packages, and larger numbers of fingers are assigned to the lower quality search packages. In addition, no detailed match is required for the higher quality search packets but may be used for the lower quality search packets, and if a match is found at any level, the search is complete. On the basis of these features for the present invention, response time and accuracy of the matching process is greatly improved.

Following is a more detailed example that shows how search packages are formed, the number of search packages is calculated and the matches are carried out. Let us assume that a given active search record includes ten fingerprints and each fingerprint is graded into A, B, C and D quality clusters as described above. Thus, the A cluster includes A quality prints. The B Cluster includes B or above quality prints. The C cluster includes C or above quality prints, and the D cluster includes D or above quality prints. Accordingly, A quality prints are included in all four clusters, while D quality prints are only included in the D cluster.

Let us further assume that the accuracy requirement specified by a customer is d %. Moreover, based on a quality table for a corresponding designed AFIS system: for all the fingerprints with A quality in the database, the designed AFIS system requires n1 number of fingers to search to achieve the accuracy of d %; for the fingerprints with B or above quality in the database, the AFIS system requires n2 number of fingers to search to achieve the accuracy of d %; for the fingerprints with C or above quality in the database, the AFIS system requires n3 number of fingers to search to achieve the accuracy of d %; and for the fingerprints with D or above quality in the database, the AFIS system requires n4 number of fingers to search to achieve the accuracy of d %, wherein $1 \leq n1 < n2 < n3 < n4 \leq 10$. Finally, let us assume that within the search record, there are: m number of fingers with A quality prints; m1 number of fingers with B or higher quality prints; m2 number of fingers with C or higher quality prints; and 10 fingers with D or higher quality prints.

Based on the above assumptions, the number M of search packages may be determined as follows. Since there are m fingers with A quality prints from the search record, and n1 number of fingers with A quality fingerprints is required to achieve the accuracy % d, the number of search packages that can be formed in the A cluster is C(m,n1), wherein C(a,b) is the well known binomial coefficient, e.g., c(a,b) =c!/((c−b)!b!). Similarly, the number of search packages that can be formed in the B cluster is C(m1,n2). The number of search packages that can be formed in the C cluster is C(m2,n3), and the number of search packages that can be formed in the D cluster is C(10,n4). Thus, the total number M of search packages may be calculated by adding all of the combinatory patterns from four clusters, i.e., M=C(m,n1)+C(m1,n2)+C(m2,n3)+C(10,n4)=m!/((m−n1)!n1!)+m1!/((m1−n2)!n2!)+m2!/((m2−n3)!n3!)+(10)!/((10−n4)!n4!).

Following is a specific case, wherein the clusters and search packages are formed in accordance with a given customer accuracy requirement. In this case, the search record includes ten fingerprints that have a quality distribution as follows:

| Finger No: | 1 | 2 | 3 | 4 | 5 | 6 | 7 | 8 | 9 | 10 |
|---|---|---|---|---|---|---|---|---|---|---|
| | A | B | C | D | A | B | A | C | B | D |

Moreover, the customer's accuracy requirement is 99.8% hit rate and 0.01% false hit rate for a database size of one million. The designed AFIS system is able to achieve an accuracy performance in accordance with the following accuracy table, in a database size of one million under the enrolled print quality conditions, wherein the database has a typical quality distribution of 15% A quality prints, 45% B quality prints, 30% C quality prints and 10% D quality prints:

For A quality search prints and the corresponding A quality mated file prints

| Number of fingers: | 1 | 2 | 3 | 4 | >=5 |
|---|---|---|---|---|---|
| Hit rate: | 98.5% | 99.9% | 99.99% | 99.999% | 100% |
| False hit rate: | .01% | .01% | .01% | .01% | .01% |

For B or above search prints and the corresponding B or above mated file prints

| Number of fingers: | 1 | 2 | 3 | 4 | 5 | >=6 |
|---|---|---|---|---|---|---|
| Hit rate: | 88.5% | 98.9% | 99.8% | 99.99% | 99.999% | 100% |
| False hit rate: | .01% | .01% | .01% | .01% | .01% | .001% |

For C or above search prints and the corresponding C or above mated file prints

| No. of fingers: | 1 | 2 | 3 | 4 | 5 | 6 | 7 | 8 | 9 |
|---|---|---|---|---|---|---|---|---|---|
| Hit rate: | 78.5% | 89.9% | 95.9% | 98.9% | 99.5% | 99.8% | 99.9% | 99.99% | 100% |
| False hit rate: | .01% | .01% | .01% | .01% | .01% | .01% | .01% | .01% | .001% |

For D or above search prints and the corresponding D or above mated file prints

| No. of fingers: | 1 | 2 | 3 | 4 | 5 | 6 | 7 | 8 | 9 | 10 |
|---|---|---|---|---|---|---|---|---|---|---|
| Hit rate: | 75.5% | 85.9% | 90.9% | 95.9% | 97.9% | 98.5% | 99.5% | 99.8% | 99.9% | 99.99% |
| False hit rate: | .01% | .01% | .01% | .01% | .01% | .01% | .01% | .01% | .01% | .001% |

Based on the system accuracy specification, only two fingers are required from the search record to search an A quality database such that all A quality searches achieve the 99.8% hit rate and the 0.01% false hit rate, i.e., the desired customer accuracy performance. Three fingers are required from the search record to search a B or above quality database such that all B or above quality searches achieve the desired customer accuracy performance. Six fingers are required from the search record to search a C or above quality database such that all C or above quality searches achieve the desired customer accuracy performance, and eight fingers are required from the search record to search a D or above quality database such that all D or above quality searches achieve the desired customer accuracy performance.

The above equations may now be used to determine the search packets for each of the quality clusters A, B, C and D. Since two fingers must be assigned to cluster A in order to achieve the accuracy requirement, and there are three fingers in the search record having an A quality, the number of combinatory finger numbers in the A cluster is C(3,2)=3. Thus, there are three finger number search packages in the first cluster. The finger number search packages are finger 1 and finger 5, i.e., search packet (15), finger 1 and finger 7, i.e., search packet (17), and finger 5 and finger 7, i.e., search packet (57). Since three fingers must be assigned to cluster B in order to achieve the accuracy requirement, and there are six fingers in the search record having a B or better quality, the number of combinatory finger numbers in the B cluster is C(6,3)=20. Thus, there are twenty finger number search packages in the second cluster. The finger number search packages are 125, 126, 127, 129, 156, 157, 159, 167, 169, 179, 256, 257, 259, 267, 269, 279, 567, 569, 579 and 679. Since six fingers must be assigned to cluster C in order to achieve the accuracy requirement, and there are eight fingers in the search record having a C or better quality, the number of combinatory finger numbers in the C cluster is C(8,6)=28. Thus, there are twenty eight finger number search packages in the third cluster. The finger number search packages are 125679, 125673, 125678, 125639, 125689, 125379, 125879, 123679, 128679, 135679, 185679, 325679, 825679, 125638, 125389, 123879,138679, 385679, etc. Finally, since eight fingers must be assigned to cluster D in order to achieve the accuracy requirement, and all of the fingers in the search record have a D or better quality, the number of combinatory finger numbers in the D cluster is C(10,8)=45. Thus, there are forty five finger number search packages in the fourth cluster.

Accordingly, M=3+20+28+45=96 total search packages, and the file records in the filtered file database are, thereby, retrieved according to the finger number and the number of fingers of each search package. A search may then be started at the A quality cluster of the first finger of the first search package against the corresponding finger and the corresponding file records and proceed, for instance, in accordance with the method illustrated in the flow diagram of FIG. 2.

It will be appreciated by those of ordinary skill in the art that the above conceptual scheme for each search case, i.e. based on a given active search record, can be very efficiently implemented by indexing the file database based on the image quality, the finger number and the number of fingers used for the search. This method of dynamic indexing is derived based on the attributes of the search package (the image quality, finger number, and the number of fingers). In this way, an expensive reorganization of the file database into actual bins based on the image quality, finger number, etc., may be avoided even though such an embodiment may be used with the present invention.

In accordance with the present invention is an improved automatic fingerprint identification system and method that achieves substantially increased speed over the prior art, without sacrificing accuracy in the identification process. For instance, the low and high bound of match percentage saving are 40% and 96% for an AFIS system, wherein the system is able to achieve a 99.9% hit rate: with two fingers, if all the searched and matched fingerprints are A quality; with four fingers, if all the searched and matched fingerprints are B or above quality; with six fingers if all the searched and matched fingerprints are C or above quality; and with ten fingers if all the searched and matched fingerprints are D or above quality.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method for comparing a search record against a file database comprising a plurality of file records, said method comprising the steps of:
    a) receiving a search record comprising multiple search prints;
    b) generating multiple hierarchical clusters, each said cluster having a different minimum quality level;
    c) for each said cluster, generating at least one corresponding search package comprising multiple search prints selected from said search record;
    d) of the clusters not selected, selecting a cluster having the highest minimum quality level;
    e) of the search packages not selected selecting a search package corresponding to the selected cluster and retrieving, as a function of the selected search package, a corresponding file record comprising multiple file prints for comparing the selected search package to the corresponding retrieved file record; and
    f) determining whether a match is found, and if no match is found returning to step e) until all the search packages are compared; and if no match is found in the selected cluster returning to step d) until all the file records are compared.

2. The method of claim 1, wherein each said search print in the selected search package and each said file print in the corresponding retrieved file record has a print quality that is at least equal to the minimum quality level of the selected cluster.

3. The method of claim 1, wherein said step of determining whether a match is found is performed each time a search print in the selected search package is compared to a file print in the corresponding retrieved file record.

4. The method of claim 1, wherein said search record comprises ten search prints.

5. The method of claim 1, wherein each file record in said file database comprises ten file prints.

6. The method of claim 1, wherein said method continues until a match is found or all file records from said file database have been retrieved and compared to a corresponding search package.

7. The method of claim 1, wherein each said retrieved file record is compared only once to any said generated search package.

8. The method of claim 1 further comprising the steps of retrieving an accuracy requirement and assigning a number of fingers to each said cluster based on said accuracy requirement.

9. The method of claim 8, wherein the number of search prints in each said generated search package is equal to the number of fingers assigned to its corresponding cluster.

10. The method of claim 9, wherein for each said cluster the number of corresponding search packages generated is a function of the number of fingers assigned to the cluster and the number of search images in the search record having a print quality that is at least equal to the minimum quality level of the cluster.

11. The method of claim 10, wherein the number of corresponding search packages generated for a given cluster is determined by a binomial coefficient C(a,b), where b is the number of fingers assigned to said given cluster, and a is the number of search images in the search record having a print quality that is at least equal to the minimum quality level of said given cluster.

12. The method of claim 1, wherein:
    the search prints in each said selected search package correspond to a first set of different finger numbers;

the file prints in each said retrieved file record corresponding to the selected search package correspond to a second set of different finger numbers; and said second set of finger numbers includes at least all of the finger numbers of said first set.

13. The method of claim 1, wherein retrieving said files records causes said file database to be virtually divided into a number of different file bins, said number of file bins being a function of the number of search packages generated.

14. The method of claim 1, wherein each said selected search package is selected as a function of at least one metric.

15. The method of claim 1, wherein the selected search package is compared to the corresponding retrieved file record based on a matching strategy that is a function of the minimum quality level of the cluster corresponding to said selected search package.

16. The method of claim 15, wherein said matching strategy is based on a single matcher processor.

17. The method of claim 16, wherein said matcher processor is a minutiae matcher processor.

18. The method of claim 15, wherein said matching strategy is based on at least two different matcher processors.

19. The method of claim 18, wherein said at least two matcher processors includes a coarse minutiae matcher processor and an enhanced matcher processor.

20. The method of claim 18, wherein said matching strategy is based on a down-selection process.

21. The method of claim 1, wherein said corresponding file record is retrieved as a function of indexing the file database.

22. A method for comparing a search record against a file database comprising a plurality of file records, said method comprising the steps of:
 a) receiving a search record comprising multiple search prints and retrieving an accuracy requirement;
 b) generating multiple hierarchical clusters, each said cluster having a different minimum quality level;
 c) for each said cluster, assigning a number of fingers based on said accuracy requirement and generating at least one corresponding search package comprising a number of search prints that is equal to the number of fingers assigned to the corresponding cluster;
 d) of the clusters not selected, selecting a cluster having the highest minimum quality level;
 e) of the search packages not selected, selecting a search package corresponding to the selected cluster and retrieving, as a function of the selected search package, a corresponding file record comprising multiple file prints for comparing the selected search package to the corresponding retrieved file record, wherein each said search print in the selected search package and each said file print in the corresponding retrieved file record has a print quality that is at least equal to the minimum quality level of the selected cluster; and
 f) determining whether a match is found, and if no match is found returning to step e) until all of the search packages are compared; and if no match is found in the selected cluster returning to step d) until all the file records are compared.

23. A distributed matcher controller configured for performing a method comprising the steps of:
 a) receiving a search record comprising multiple search prints;
 b) generating multiple hierarchical clusters, each said cluster having a different minimum quality level;
 c) for each said cluster, generating at least one corresponding search package comprising multiple search prints selected from said search record;
 d) of the clusters not selected, selecting a cluster having the highest minimum quality level;
 e) of the search packages not selected, selecting a search package corresponding to the selected cluster and retrieving, as a function of the selected search package, a corresponding file record comprising multiple file prints for comparing the selected search package to the corresponding retrieved file record; and
 f) determining whether a match is found, and if no match is found returning to step e) until all of the search packages are compared; and if no match is found in the selected cluster returning to step d) until all of the file records are compared.

24. An automatic fingerprint identification system that includes a distributed matcher controller configured for performing a method comprising the steps of:
 a) receiving a search record comprising multiple search prints;
 b) generating multiple hierarchical clusters, each said cluster having a different minimum quality level;
 c) for each said cluster, generating at least one corresponding search package comprising multiple search prints selected from said search record;
 d) of the clusters not selected, selecting a cluster having the highest minimum quality level;
 e) selecting at least one search package corresponding to the selected cluster and retrieving, as a function of the selected search package, a corresponding file record comprising multiple file prints for comparing the selected search package to the corresponding retrieved file record; and
 f) determining whether a match is found, and if no match is found returning to step e) until all of the search packages are compared; and if no match is found in the selected cluster returning to step d) until all of the file records are compared.

* * * * *

UNITED STATES PATENT AND TRADEMARK OFFICE
CERTIFICATE OF CORRECTION

| | | |
|---|---|---|
| PATENT NO. | : 6,973,206 B2 | Page 1 of 1 |
| APPLICATION NO. | : 10/834618 | |
| DATED | : December 6, 2005 | |
| INVENTOR(S) | : Peter Lo | |

It is certified that error appears in the above-identified patent and that said Letters Patent is hereby corrected as shown below:

Column 16
In claim 24, line 42, change "selecting at least one search package corresponding to the selected cluster and retrieving, as a function of the selected search package, a corresponding file record comprising multiple file prints for comparing the selected search package to the corresponding retrieved file record; and" to --of the search packages not selected, selecting a search package corresponding to the selected cluster and retrieving, as a function of the selected search package, a corresponding file record comprising multiple file prints for comparing the selected search package to the corresponding retrieved file record; and --

Signed and Sealed this

Seventeenth Day of October, 2006

JON W. DUDAS
*Director of the United States Patent and Trademark Office*